(12) United States Patent
Smith et al.

(10) Patent No.: US 6,540,909 B2
(45) Date of Patent: Apr. 1, 2003

(54) FLUID FILTER WITH PRESSURE RELIEF VALVE

(75) Inventors: Paul B. Smith, Ann Arbor, MI (US); Kevin J. Rucinski, Saline, MI (US); Alfred Tondreau, Saline, MI (US); Ken Conti, Hampstead, NH (US)

(73) Assignee: Davco Technology, LLC, Saline, MI (US)

( * ) Notice: Subject to any disclaimer, the term of this patent is extended or adjusted under 35 U.S.C. 154(b) by 0 days.

(21) Appl. No.: 09/800,982

(22) Filed: Mar. 7, 2001

(65) Prior Publication Data
US 2002/0125178 A1 Sep. 12, 2002

(51) Int. Cl.[7] .................. B01D 35/143; B01D 35/147
(52) U.S. Cl. .................. 210/95; 210/130; 210/132; 210/456; 210/443
(58) Field of Search .................. 210/85, 90, 94–95, 210/130, 132, 443, 456, 497.01; 116/268, DIG. 42

(56) References Cited

U.S. PATENT DOCUMENTS

| | | | |
|---|---|---|---|
| 2,559,267 A | | 7/1951 | Winslow et al. |
| 2,638,581 A | * | 5/1953 | Marvel |
| 2,669,707 A | * | 2/1954 | Ehrman |
| 2,877,902 A | | 3/1959 | Chase et al. |
| 2,888,141 A | | 5/1959 | Coates et al. |
| 2,995,249 A | | 8/1961 | Boewe et al. |
| 2,998,138 A | * | 8/1961 | Mould et al. |
| 3,061,101 A | | 10/1962 | Humbert, Jr. |
| 3,297,162 A | * | 1/1967 | Mouwen |
| 3,315,808 A | | 4/1967 | Hopkins |
| 3,317,046 A | | 5/1967 | Raupp et al. |
| 3,331,509 A | * | 7/1967 | Gray |
| 3,374,892 A | * | 3/1968 | Samalon |
| 3,508,657 A | * | 4/1970 | Cooper |
| 3,529,721 A | | 9/1970 | Papp |
| 3,980,457 A | * | 9/1976 | Smith |
| 4,035,306 A | | 7/1977 | Maddocks |
| 4,629,558 A | | 12/1986 | Garritty |
| 4,990,247 A | | 2/1991 | Vandenberk |
| 5,382,355 A | * | 1/1995 | Arlozynski |
| 5,458,767 A | | 10/1995 | Stone |

* cited by examiner

*Primary Examiner*—Joseph W. Drodge
*Assistant Examiner*—Terry K. Cecil
(74) *Attorney, Agent, or Firm*—Young & Basile, P.C.

(57) ABSTRACT

A fluid filter assembly having a relief valve for visually indicating [the life of] when a filter element may be replaced. The fluid filter assembly of the present invention provides a vertical, transparent housing having a fluid inlet for communicating a fluid into the housing and a fluid outlet for communicating fluid downstream of said housing. A filter element is disposed within the housing between the fluid inlet and the fluid outlet for filtering the fluid. In [the preferred] a first embodiment, a [frusto-conical] divider is connected to the top of the filter element and extends downward adjacent a bottom portion of the filter element wherein the fluid from the inlet rises between the filter element and the inside of the divider and between the outside of the divider and an inside surface of the housing. A relief valve is provided in the top of the filter element and is in communication with the unfiltered and filtered side of the filter element. The relief valve opens at a predetermined pressure level across the filter element thereby raising the fluid level and providing a practical [visual] indicator that the filter element may be replaced [needs replacement].

6 Claims, 5 Drawing Sheets

US 6,540,909 B2

FLUID FILTER WITH PRESSURE RELIEF VALVE

FIELD OF THE INVENTION

The present invention relates to fluid filters, and more particularly, a fluid filter having a pressure relief valve.

BACKGROUND OF THE INVENTION

U.S. Reissued Pat. No. 37,165, assigned to Davco Technology, L.L.C., discloses a diesel fuel processor of the type generally shown in FIG. 1. That filter provides the user with a practical estimate of the condition of the filter element 20 as a function of the height of the fluid level in the upper filter chamber 17 as the fluid seeks the least possible pressure differential across the filter element 20. During operation of the engine, fuel moves from the lower chamber 16, through passage 15 to upper chamber 17, through the cylindrical filter element 20 and out to the engine through the opening at the lower center of the upper chamber 17.

Generally speaking, fuel tends to rise in the upper chamber 17 as the filter element 20 traps more and more contaminates from the bottom up. When the fuel level reaches the top of the filter element 20 in normal operation, this may be taken as a time to consider changing the filter element 20.

SUMMARY OF THE INVENTION

The present invention provides a vertical, two-part transparent housing having a fuel inlet for communicating fluid into the housing and a fluid outlet for communicating fluid downstream of said housing. A filter element is disposed within the housing between the fluid inlet and the fluid outlet for filtering the fluid. The housing includes a plastic top at least a portion of which is transparent for viewing the fluid level in the housing. A relief valve is mounted atop the filter element for maintaining and relieving a predetermined level of pressure across the filter element. A divider may connect to the filter element and extend between a housing wall and an unfiltered side of the filter element to divide the housing into an outer region and an inner region, wherein the outer and inner regions are in communication at a lower portion of the housing. A relief valve is in communication with a filtered side and the unfiltered side of the filter element and opens when the pressure across the filter element exceeds the predetermined pressure level thereby raising the level of fluid in the outer region of the housing. A segment of filter media may be adjacently mounted to the relief valve to filter any unfiltered fluid that passes through the relief valve to the filtered side of the filter element.

Alternatively, the relief valve may comprise a restrictive filter media integrally connected to the filter element. The restrictive filter media prevents the flow of fluid through the restrictive filter media until the pressure across the filter element reaches the predetermined pressure level thereby causing the fluid in the housing to rise.

BRIEF DESCRIPTION OF THE DRAWINGS

The description herein makes reference to the accompanying drawings wherein like referenced numerals refer to like parts .throughout several views and wherein.

DESCRIPTION OF THE PREFERRED EMBODIMENT

Figure 1:
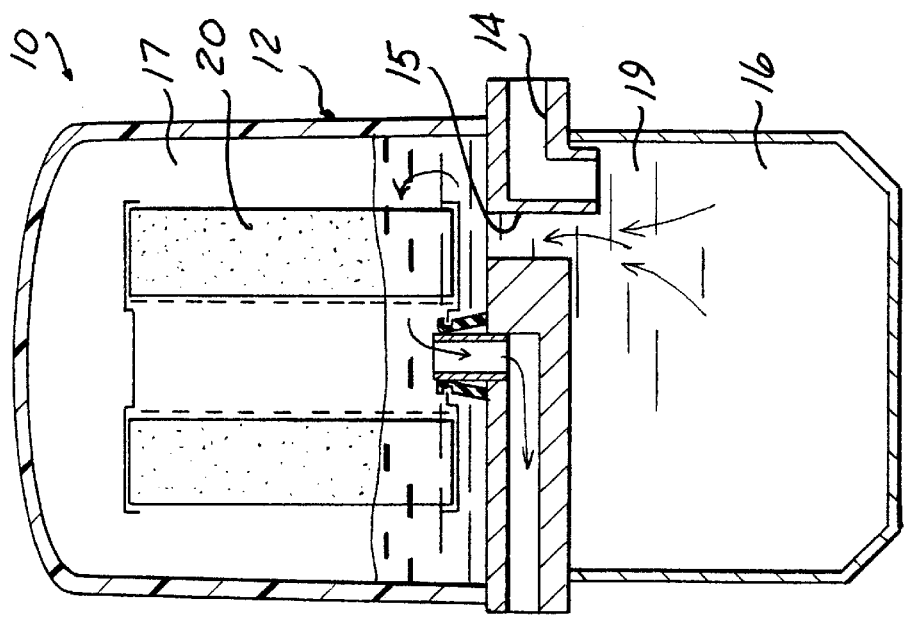
FIG. 1 is a schematic drawing showing the fluid flow path and the normal rising fluid path of a prior art fuel filter assembly.

Referring to the drawings, the present invention will now be described in detail with reference to several illustrative embodiments thereof.

Figure 2:
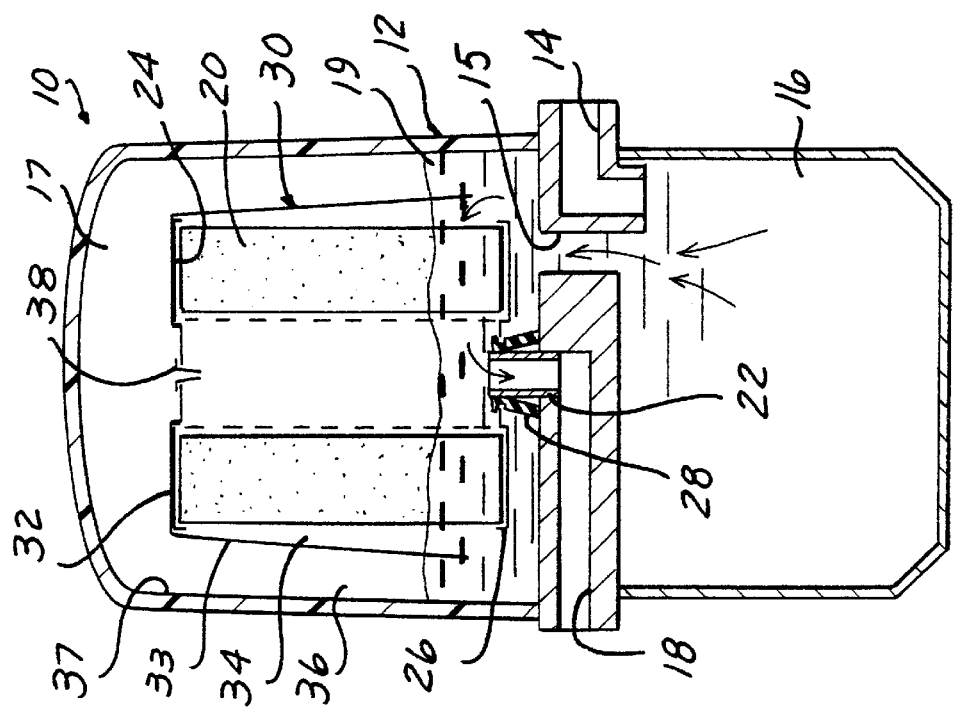
FIG. 2 is a schematic drawing showing the rising fluid level in the fluid filter assembly of the present invention.
Figure 4:
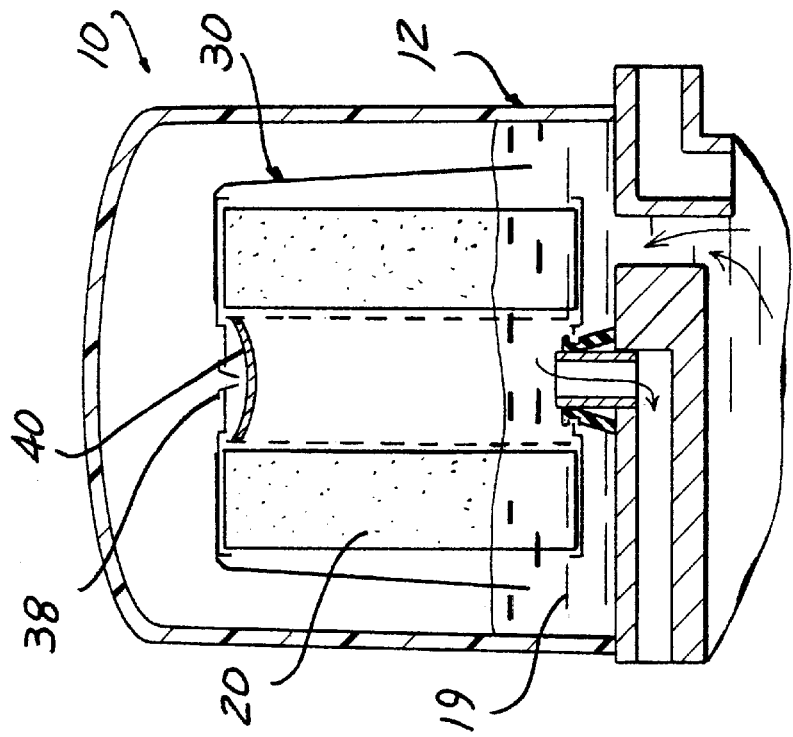
FIG. 4 is a schematic drawing showing a segment of filter media being utilized underneath the relief valve of the present invention.
Figure 3:
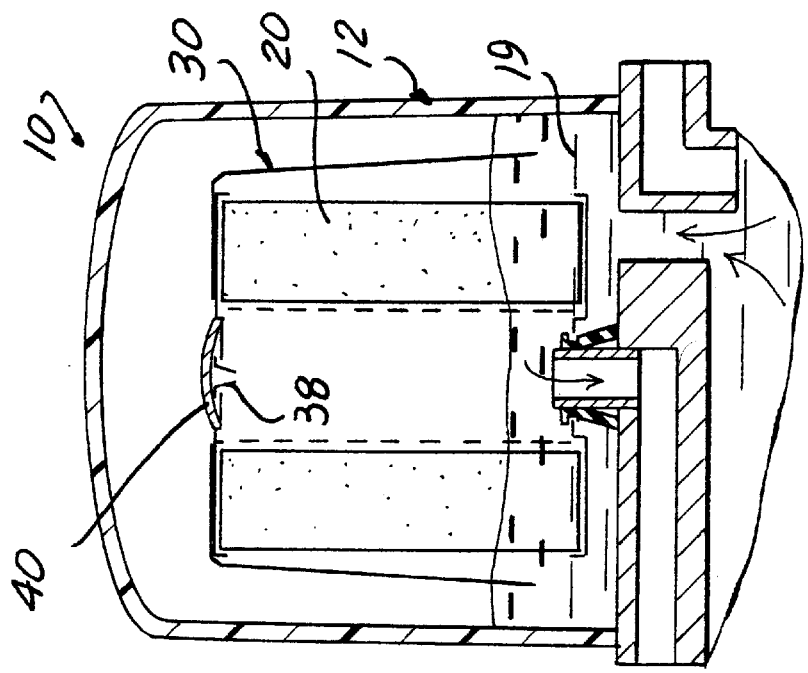
FIG. 3 is a schematic drawing showing a segment of filter media being utilized above a relief valve of the present invention.

FIG. 2 shows a fluid filter assembly 10 of the present invention in a first embodiment. The fluid filter assembly 10 is best suited for filtering and processing diesel fuel. The fluid filter assembly 10 is mounted vertically upright and provides a closed cylindrical housing 12 having a lower fluid storage chamber 16, preferably made of metal and an upper filter chamber 17, the outer housing of which is preferably made of transparent plastic. A fluid inlet 14 in the lower chamber 16 allows fuel to enter the lower fluid storage chamber 16, wherein fuel flows through passage 15 to the upper chamber 17. A hollow, cylindrical filter element 20 is housed within the upper chamber 17 of the housing 12 for filtering fuel 19 and passing it to a fluid outlet 18. A relief valve 38 mounted in the top of the filter element 20 is designed to open when the pressure level across the filter element 20 reaches a predetermined level. A relief valve filter or secondary filter element 40 filters fuel 19 that may pass through the relief valve 38. FIGS. 3 and 4 show the assembly of FIG. 2 with the addition of the secondary filter element 40 which, as shown, may be on either the upstream or downstream side of the valve 38.

To filter contaminants from the fuel 19, the filter element 20 is fabricated from a pleated porous paper material. The filter element 20 encircles a central filter tube 22 and is contained by a top and bottom end cap 24, 26, respectively, as seen in FIGS. 2 and 7–10. The top and bottom end caps, 24, 26 are sealed to the edges of the filter element 20 to preclude any possible leak paths at the ends of the filter element 20. A flexible seal 28 is provided on the bottom end cap 26 of the filter element 20 to create a seal between the central filter tube 22 and an inner core 43 of the filter element 20 and ensure that unfiltered fuel 19 does not leak into or escape through the fluid outlet 18. The filter element 20 is preferably pleated or concentrically wound but may also be arranged in any of the ways known to one familiar with filtration construction so as to direct the fuel 19 through the filter element 20. In addition, the filter element 20 may be fabricated from a hydrophobic filter material to filter out water from the fuel 19.

As seen in FIGS. 2–5, the portion of the housing 12 between the filter element 20 and an outer wall 37 of the upper filter chamber 17 of the housing 12 is preferably divided by a substantially frusto-conical flow divider 30. The divider 30 has a top portion 32 that is either integrally or sealedly connected to the top end cap 24 of the filter element 20. The divider 30 also has a bottom portion 33 that extends downward toward the bottom of the filter element 20, while also tapering or flaring outward away from the filter element 20. It should be noted that the present invention is not limited to a frusto-conical divider 30, but rather, the divider may also be substantially cylindrical wherein the bottom portion of the divider may extend downward substantially parallel to the filter element 20. In both embodiments, the divider 30 essentially divides the upper chamber 17 of the housing 12 into an inner portion or region 34 and an outer portion or region 36. The inner portion 34 is the space contained between the outside or unfiltered side of the filter element 20 and the inner surface of the divider 30. The outer portion 36 is the space contained between the outer surface of the divider 30 and the inner surface of the outer wall 37 of the upper chamber 17 of the housing 12. The inner and outer portions 34, 36 remain in fluid communication at the bottom portion of the upper filter chamber 17 of the housing 12.

In order to maintain and relieve the pressure in the upper chamber 17 of the housing 12, a relief valve 38 is mounted in the top end cap 24 of the filter element 20. The top end cap 24 is fabricated from a thin metallic material having a shape complementary to the top of the filter element 20. The top end cap 24 has a substantially circular configuration with sidewalls 39 that extend downward from its periphery to sealingly connect to and cover the top of the filter element 20. The top end cap 24 also has a centrally located recessed portion 41 which is received by and complementarily engages the inner core 43 of the filter element 20.

Figure 8:
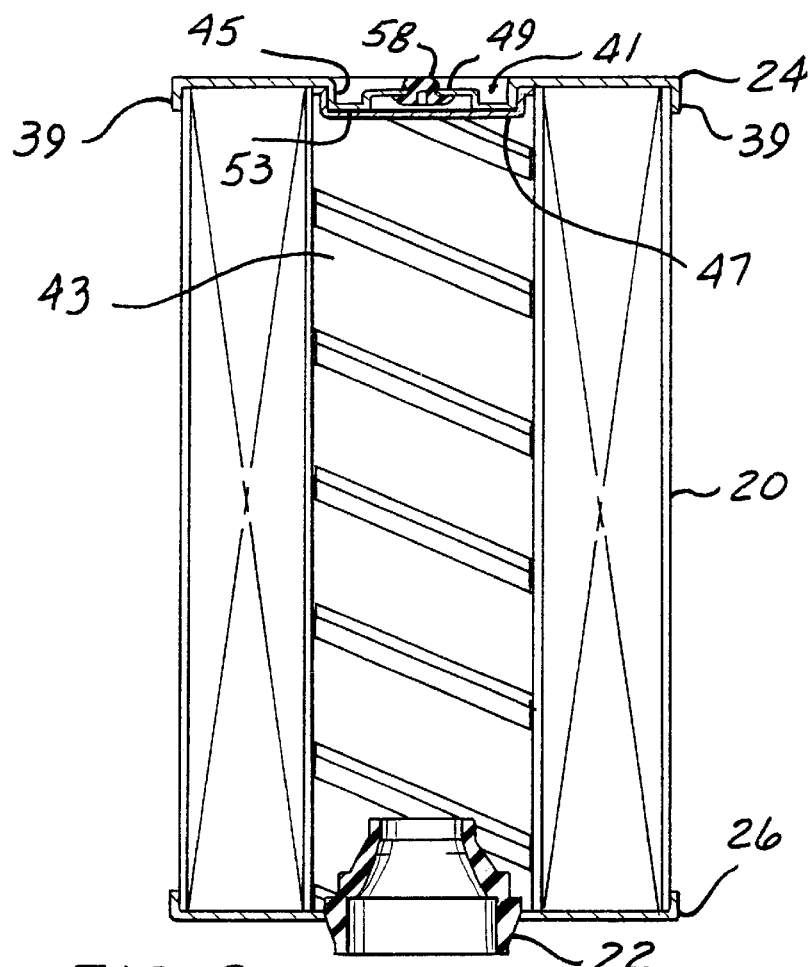
FIG. 8 is a sectional view of the filter element of the present invention taken in the direction of arrows 8—8 in FIG. 7.
Figure 7:
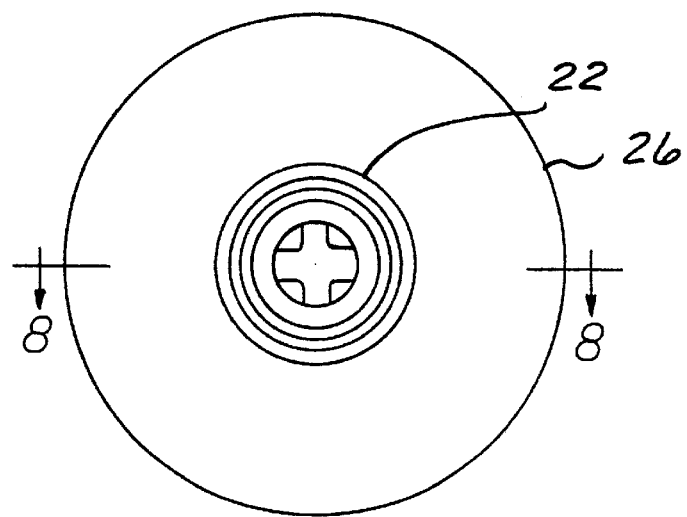
FIG. 7 is a bottom view of the filter element of the present invention.
Figure 9:
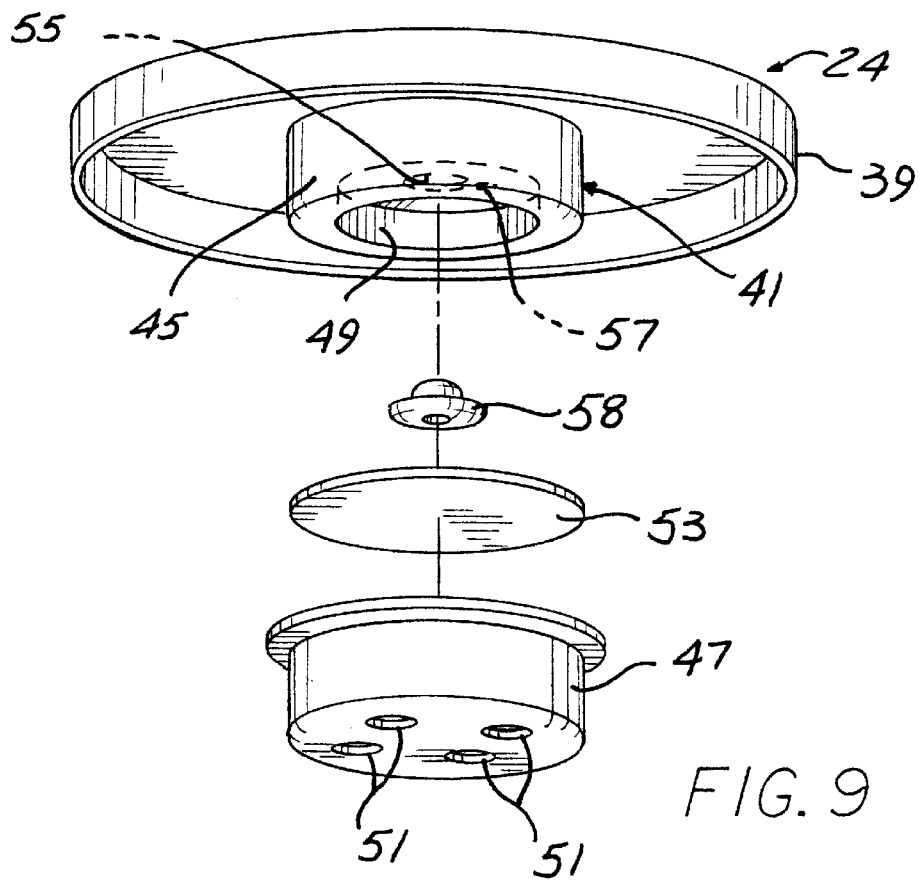
FIG. 9 is an exploded view of the relief valve shown in the top of the filter element of the present invention.
Figure 10:
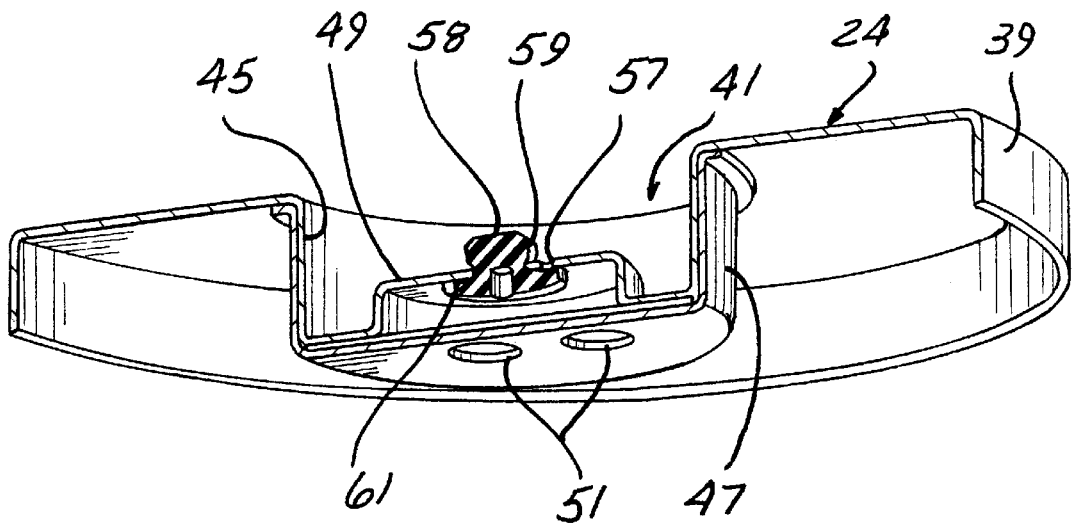
FIG. 10 is a sectioned perspective view of the relief valve shown in the top of the filter element of the present invention.

Looking to FIGS. 8–10, the recessed portion 41 of the top end cap 24 is formed by two layers of thin metallic material. A first inner layer 45 is integrally connected to the sidewalls 39 and the portion of the top end cap 24 that extends over the top of the filter element 20. A second outer layer of the recessed portion 41 is formed by a substantially cylindrical cup that is connected to and complementarily engages the inner layer 45 of the recessed portion 41. The inner layer 45 of the recessed portion 41 has a raised portion 49 relative to the outer layer 47. The outer layer 47 has four apertures 51 that extend therethrough and align directly under the raised portion 49 of the inner layer 45 of the recessed portion 41. A sheet of filter media 53 lies between the inner layer 45 and the outer layer 47 of the recessed portion 41 so as to cover the four apertures 51 extending through the outer layer 47.

The raised portion 49 of the inner layer 45 provides two apertures 55, 57 extending therethrough. The larger of the two apertures 55 receives a flexible valve member 58 having an inverted mushroom-shaped configuration. The stem portion 59 of the mushroom-shaped configuration is disposed within the larger aperture 55. The head portion 61 of the flexible member 58 extends across the underside of the raised portion 49 of the inner layer 45 such that the head portion 61 of the flexible member 58 covers the smaller aperture 57. The smaller aperture 57 acts as a port such that when the pressure level across the filter element 20 reaches a predetermined level, the head portion 61 of the flexible member 58 flexes away from the smaller aperture 57 thereby allowing fuel 19 and/or air/vapor from the unfiltered side of the filter element 20 to pass through the smaller aperture 57. Fuel 19 will only pass through the smaller aperture 57 after all of the air/vapor has first passed through the smaller aperture 57. The fuel 19 and/or air/vapor passes through the sheet of filter media 53 and through the four apertures 51 in the outer layer 47 of the recessed portion 41 to the filtered side of the filter element 20.

The relief valve 38 is normally closed until the pressure level across the filter element 20 exceeds a predetermined level. When the relief valve 38 is closed, the air/vapor within the outer portion 36 of the housing 12 is trapped thereby forcing the fuel level in the outer portion 36 to be lower than the fuel level in the inner portion 34. This occurs because as long as the filter element 20 has not trapped a high level of contaminants, air/vapor and fuel 19 within the inner portion 34 will pass through the filter element 20 at a pressure less than the pressure level in which the relief valve 38 is to open. Once the pressure across the filter element 20 exceeds the predetermined level due to the filter element capturing a high level of contaminants, the relief valve 38 opens and allows air/vapor and/or fuel 19 to pass from the outer portion 36 of the housing 12 to the inner core 43 of the filter element 20.

Figure 6:
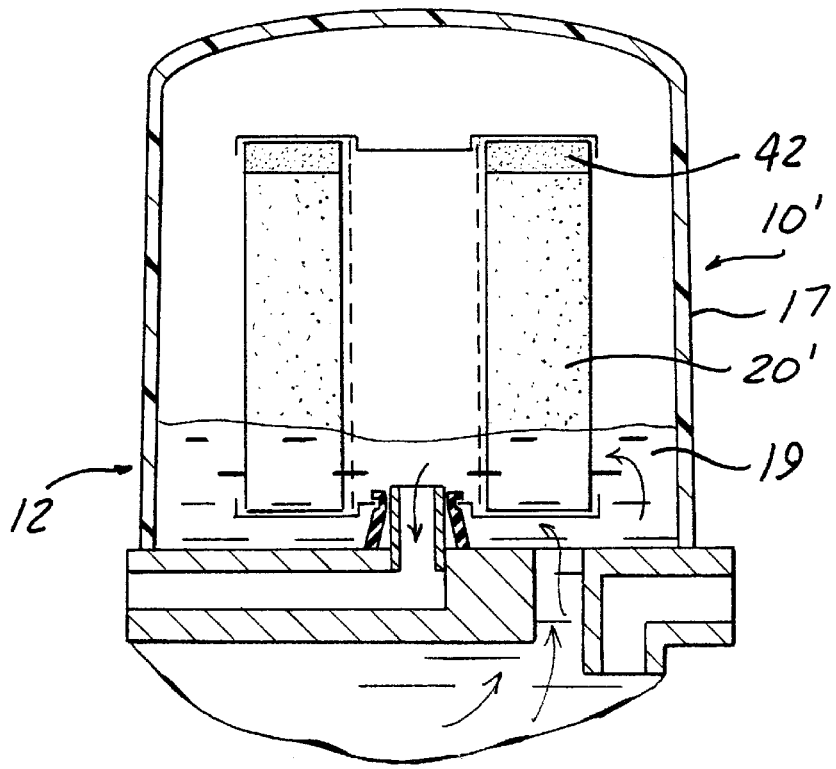
FIG. 6 is a schematic drawing showing a restrictive media being utilized as a relief valve in the fluid filter assembly of the present invention.

In a secondary embodiment of the fluid filter assembly 10', a restrictive filter media section 42 of the filter media 20' is either integrally formed on the top of the filter media 20' or is attached to the upper portion of the filter media 20', as shown in FIG. 6. The restrictive section 42 of the filter media 20' acts in the same manner as the relief valve 38 and the relief valve filter 40 of the preferred embodiment, but the secondary embodiment does not require the divider 30. The restrictive section 42 of the filter media 20' only allows air/vapor and/or fuel 19 to pass through the restrictive section 42 once the pressure level across the filter element 20 exceeds a predetermined level. This ensures that the fuel level within the housing 12 will remain at a level below the restrictive filter media 42. Once the predetermined pressure level is reached, air/vapor and/or fuel 19 is allowed to pass through the restrictive filter media 42 thereby raising the fuel level and providing a visual indicator that the filter element 20' may be replaced.

Figure 5:
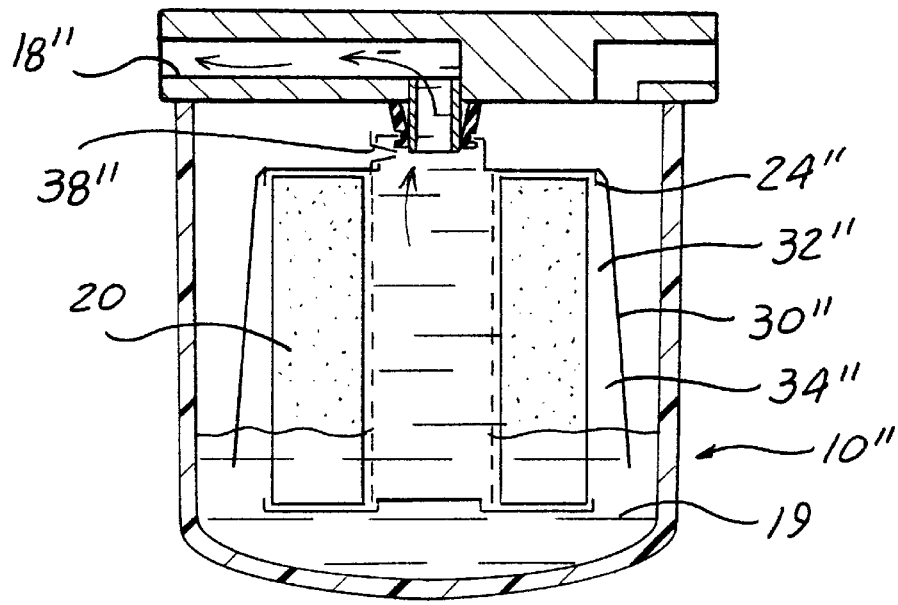
FIG. 5 is a schematic drawing of a hang down fluid filter assembly of the present invention.

In yet another embodiment of the present invention, a divider 30" and a relief valve 38" may be utilized in conjunction with a hang down fluid filter assembly 10", as shown in FIG. 5. The structure in this embodiment is similar to that of the preferred embodiment in that the divider 30" is sealedly connected to a top end cap 24". The divider 30" extends downward along the bottom portion of the filter element 20 while flaring outward from the filter element 20. A relief valve filter (although not shown in FIG. 5 but similar to that shown in FIGS. 3 and 4) is mounted in a portion of the central filter tube 22. The relief valve filter is incorporated with the relief valve 38" to prevent any unfiltered fuel 19 from entering fluid outlet 18". The relief valve 38" in the hang down fluid filter assembly 10" works in the same manner as the preferred embodiment. The divider 30" forms an outer portion 34" and an inner portion 32" of the housing 12" wherein the trapped air in the outer portion 34" forces the fuel level in the outer portion 34" to be lower than the fuel level in the inner portion 32". This ensures that the filter element 20 will have captured a high level of contaminants before reaching the predetermined pressure level that will open the relief valve 38".

In operation, the prior art device functions as depicted in FIG. 1. Fuel 19 enters the fluid inlet 14 of the fluid filter assembly 10. and accumulates within the lower chamber 16 of the housing 12. Fuel 19 flows through the passageway 15 leading to the upper filter chamber 17 wherein an unfiltered fuel level is established within the upper filter chamber 17.

The fuel 19 is drawn into the filter chamber 17 by vacuum (as most commonly occurs in diesel fuel filters) or forced by low pressure (as seen in oil, coolant or many other filters) until it finds a path through the filter element 20. As the filter element 20 captures contaminants, the restriction increases temporarily overcoming the surface tension of fluid covering the unused pores of the filter 20 element and causing a temporary flow of air/vapor through the filter element 20. As the air/vapor passes, it creates a void on the outside of the filter element 20, and the fuel level rises to fill the void. The new fuel level allows flow through clean and unused pores of the filter element 20 and the restriction through the filter element 20 reestablishes itself at a fuel level as previously described. Once the fuel level establishes itself, the surface tension of the fuel 19 across the remaining pores of the filter media 20 prevents the flow of air/vapor through the filter element 20 until, once again, the restriction increases to a level in which air/vapor is forced through the filter element 20. This process continues as dirt and other contaminants in the fuel 19, larger than the openings in the filter element 20, are trapped and retained by the filter element 20 as the fuel 19 passes through the filter element 20. These contaminants may plug or clog the holes in the filter media 20 and restrict and/or close the paths used by the flowing fuel 19. The fuel 19 is forced to seek other open and less restrictive fuel openings that are above the level of the fuel 19, and therefore, the fuel 19 climbs up the height of the filter element 20 and uses the clean areas of the filter element 20. The process of capturing contaminants and having the fuel level rise continues until the filter element 20 is completely immersed in the flowing fuel 19. When the fuel level reaches the top of the upper filter chamber 17, this has generally been a rough indication to the user of previous filters that it may be time to change the filter element 20. The present device delays the rise of the fuel until the pressure differential across the filter element 20 reaches a predetermined level.

During the operation of the first embodiment of the present invention, fuel 19 enters the fluid filter assembly 10 and the upper filter chamber 17 in the same way as described in the device of U.S. Reissued Pat. No. 37,165. However, by employing the divider 30 and incorporating the preset relief valve 38 in the top end cap 24, the fuel level can be made to rise in closer proportion to the capturing of contaminants by the filter. element 20. This gives a practical indicator as to when the filter element 20 may be replaced. In so doing, the incoming fuel 19 and air/vapor initially behave as similarly described in the prior art. When the fuel level approaches the bottom of the divider 30, the fuel 19 continues to rise between the filter element 20 and the inside surface of the divider 30, which was previously defined as the inner portion of the housing 12, but the fuel 19 does not rise between the outer surface of the divider 30 and the outer wall of the housing 12, which was previously defined as the outer portion of the housing 12. This is because the trapped air/vapor in the outer portion 36 of the housing 12 prevents the rise of fuel 19 into the outer portion of the housing 12.

As to the inner portion 34 of the housing 12, fuel 19 and air/vapor move through the filter element 20 in a usual manner. The fuel level continues to rise between the filter element 20 and the inside surface of the divider 30 as the filter element 20 captures more contaminants. This continues until the fuel 19 rises to the full or nearly full height of the filter element 20, as previously described. Once the entire, filter element 20 begins to capture contaminants, the pressure differential across the filter element 20 begins to increase with the increased capturing of contaminants by the filter element 20. Once this pressure differential reaches a predetermined level, preferably 5" Hg, the relief valve 38 may open, and vapor/air may flow through the relief valve 38 while fuel 19 flows through the filter element 20 since both present the same amount of resistance to flow. As the pressure differential across the filter media 22 begins to exceed the 5" Hg point, the relief valve 38 becomes the preferred flow path since its pressure differential is fixed at 5" Hg. Since air/vapor is closest to the relief valve 38, the air/vapor flows through the relief valve 38 first, and the fuel 19 follows. The fuel level begins to rise in the outer portion 36 of the housing 12, thereby providing a visual indicator to the operator that the filter element 22 may be replaced The relief valve filter 40 provided in the fuel path of the relief valve 38 ensures that the fuel 19 that passes through the relief valve 38 is filtered. Once the user sees that the fuel level in the outer portion 36 of the housing 12 has risen to the top of the upper filter chamber 17, the user may replace the filter element 20.

In operation, the secondary embodiment, as depicted in FIG. 4, works in a similar manner as described in the first embodiment. The fuel level rises within the filter chamber 17, until it reaches the restrictive filter media 42 on the filter media 20. When the fuel level reaches the restrictive media 42, the pressure differential across the filter media 20' fuel must rise to a preferred level of 5" Hg in order for the air/vapor and fuel 19 to pass through the restrictive media 42. The fuel level stops at a point just below the restrictive media 42 until the filter media 20' captures enough contaminants that the pressure differential reaches the 5" Hg level. At that point, air/vapor and fuel 19 pass through the restrictive media 42, thus allowing the fuel level to rise within the filter chamber 17 of the fluid filter assembly 10'. The user may then use the risen fuel level as an indicator that the filter media 20' may be replaced.

In operation, the alternative embodiment depicted in FIG. 5 works in exactly the same manner as described in the first embodiment. The only difference in the embodiment depicted in FIG. 5 is that the housing 12" is upside down, but the fuel level responds in the same manner as described in the first embodiment.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims, the scope is to be accorded the broadest interpretation so as to encompass all such modifications and equivalent structures as is permitted under the law.

What is claimed is:

1. A fluid filter assembly comprising:
   a vertical housing having a fluid inlet for communicating said fluid into said housing and a fluid outlet for communicating said fluid downstream of said housing;
   a filter element disposed within said housing in fluid communication between said fluid inlet and said fluid outlet for filtering said fluid, said filter element having an upper end and a lower end, wherein both said ends are positioned above said fluid inlet and said fluid outlet;
   a divider connected to said filter element upper end and extending between a housing wall and an unfiltered side of said filtered element to adjacent the filter element lower end to divide said housing into an outer region and an inner region, wherein said outer and inner regions are in communication at a lower portion of said housing;

said housing having an outer cover wherein at least a portion of said outer cover is transparent for viewing the level of said fluid in said housing; and a pressure reliever in communication with a filtered side and an unfiltered side of said filter element, and said pressure reliever allowing said fluid and/or air/vapor to pass through said pressure reliever when the pressure across said filter element reaches a predetermined level, wherein the release of said pressure allows the level of said fluid to rise within said housing.

2. The fluid filter assembly stated in claim 1, further comprising:

a relief valve mounted in said upper end of said filter element and in communication with an unfiltered side and a filtered side of said filter element; and said relief valve in communication with said outer region of said housing such that air captured in said outer region of said housing causes said fluid to maintain a higher fluid level in said inner region than said outer region until said predetermined pressure level across said filter element is reached thereby opening said relief valve, allowing fluid to rise in said outer region, and providing a visual indicator as to the needed replacement of said filter element.

3. The fluid filter assembly stated in claim 2, further comprising:

said upper end of said filter element having at least two layers wherein one of said two layers has a flexible member disposed therein, and said flexible member covering a port wherein said flexible member flexes when the pressure level across said filter element reaches a predetermined level to open said port and allow fluid and/or air/vapor to pass through said port;

the other of said two layers having at least one aperture extending therethrough for allowing said fluid to pass from said unfiltered side to said filtered side of said filter element; and a filter media covering said aperture to filter any fluid passing through said aperture.

4. The fluid filter assembly stated in claim 1, wherein said housing further comprises:

a transparent outer cover for viewing the level of fluid in said housing to determine whether said filter element needs replacement.

5. A fluid filter assembly comprising:

a vertical housing having a fluid inlet for communicating said fluid into said housing and a fluid outlet for communicating said fluid downstream of said housing wherein said housing has a transparent outer cover for viewing the level of fluid in said housing;

a concentrically tubular filter element disposed within said housing in fluid communication between said fluid inlet and said fluid outlet for filtering said fluid, and said filter element having a top and a bottom wherein said fluid flows from said bottom to said top of said filter element and wherein both said top and said bottom are positioned above both said fluid inlet and said fluid outlet;

a divider connected to said top of said filter element and extending downward between an outer wall of said housing and said unfiltered side of said filter element toward a bottom of said housing to adjacent said filter element bottom wherein said divider divides a space between said outer wall of said housing and said unfiltered side of said filter element into an outer portion and inner portion of said housing wherein said inner and outer portions are in communication at said bottom of said housing; and a pressure reliever mounted in the top of said filter element and in communication with a filtered side and an unfiltered side of said filter element, and said pressure reliever allowing said fluid and/or air/vapor to pass through said pressure reliever when the pressure across said filter element reaches a predetermined level wherein the release of said pressure reliever raises the level of said fluid within said housing.

6. The fuel filter assembly stated in claim 5, wherein said pressure reliever further comprises:

a relief valve in communication with said outer portion of said housing such that captured air in said outer portion of said housing forces said fluid in said inner portion to maintain a higher level than said fluid in said outer portion until said predetermined pressure level across said filter element is reached thereby forcing said relief valve to open and allow air/vapor to pass through said relief valve thereby allowing the level of said fluid in said outer portion to rise and provide a visual indicator as to the needed replacement of said filter element.

* * * * *

UNITED STATES PATENT AND TRADEMARK OFFICE
CERTIFICATE OF CORRECTION

PATENT NO. : 6,540,909 B2
DATED : April 1, 2003
INVENTOR(S) : Smith et al.

It is certified that error appears in the above-identified patent and that said Letters Patent is hereby corrected as shown below:

Column 6,
Line 20, please delete "FIG. 4" and insert -- FIG. 6 --;
Line 23, please delete "20." and insert -- 20' --;
Line 25, please delete " 5" " and insert -- 5" --;
Line 38, please delete "housing 12" is" and insert -- housing 12 is --;

Column 8,
Lines 35, 36, 37, 39 and 43, please delete "portion" and insert -- region --.

Signed and Sealed this

Ninth Day of March, 2004

JON W. DUDAS
*Acting Director of the United States Patent and Trademark Office*